United States Patent [19]

Yabe

[11] Patent Number: 4,876,557

[45] Date of Patent: Oct. 24, 1989

[54] RECORDING MEDIUM OF AIR-SANDWICH STRUCTURE

[75] Inventor: Masao Yabe, Fujinomiya, Japan

[73] Assignee: Fuji Photo Film Co., Ltd., Kanagawa, Japan

[21] Appl. No.: 172,974

[22] Filed: Mar. 22, 1988

Related U.S. Application Data

[63] Continuation of Ser. No. 914,200, Oct. 1, 1986, abandoned.

[30] Foreign Application Priority Data

Oct. 2, 1985 [JP] Japan .................................. 60-221070

[51] Int. Cl.⁴ ............................................. G01D 15/24
[52] U.S. Cl. ................................... 346/137; 346/135.1; 346/76 L
[58] Field of Search .................. 346/135.1, 137, 76 L; 369/280, 282, 272, 273

[56] References Cited

U.S. PATENT DOCUMENTS

| 4,074,282 | 2/1978 | Balas, Jr. et al. | 346/137 X |
| 4,443,806 | 4/1984 | Ando | 346/135.1 |
| 4,449,138 | 5/1984 | Ando | 346/135.1 |
| 4,519,061 | 5/1985 | Dahneke et al. | 346/76 L |

FOREIGN PATENT DOCUMENTS 0129956  6/1987  Japan .................... 346/137

Primary Examiner—E. A. Goldberg
Assistant Examiner—Huan H. Tran
Attorney, Agent, or Firm—Gerald J. Ferguson, Jr.

[57] ABSTRACT

Disclosed is an optical disk used as a recording medium of the type described as an air-sandwiched structure including two disk-shaped substrates, which are secured to each other by way of an inner and outer plastic spacer. Together, the two substrates and the inner and outer spacer define a closed inner space, and at least one inner surface of one of the two substrates is provided with a light-sensitive recording layer. Typically, such a recording layer is sensitive to high energy light such as that from a laser beam. Each of the disk-shaped substrates includes a central hole of equal size and shape, wherein the inner spacer is ring-shaped and is positioned with its central opening coaxial with the holes in the substrates. The improvement resides in that the inside diameter of the central hole of the inner spacer is larger than the diameter of the holes of the substrates, and in that a recessed seat is provided by recessed portions formed on both substrates adjacent to and around the holes of each substrate, for precisely fitting and aligning the inner spacer to both disk-shaped substrates. Such a structure ensures accurate positioning of the optical disk on a drive spindle without interference of excess adhesive used in securing the inner spacer to the substrates, as well as to ensure that the recording medium can be rotated with high precision.

10 Claims, 1 Drawing Sheet

FIG. I
(PRIOR ART)
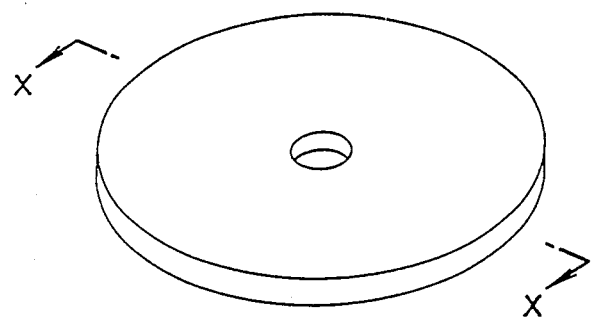
FIG. 2
(PRIOR ART)
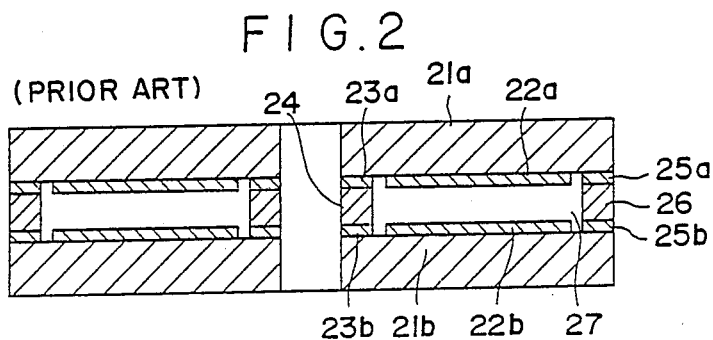
FIG. 3
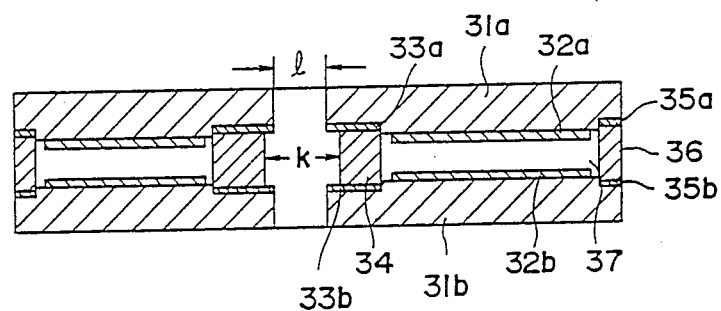

RECORDING MEDIUM OF AIR-SANDWICH STRUCTURE

This application is a continuation of Ser. No. 914,200, filed 10/1/86, now abandoned.

BACKGROUND OF THE INVENTION

1. Filed of the Invention

The present invention relates to a recording medium having air-sandwich structure, and more particularly to a recording medium of air-sandwich structure for writing and/or reading information by means of laser beam of high energy density.

2. Description of Prior Arts

Information recording media utilizing a beam of high energy density such as laser beam have been developed in recent years and are put to practical use. Such recording medium is called an optical disc and the practical applications thereof have been found, for example, as video disc and audio disc as well as disc memory for large-capacity computer and large-capacity static image file.

The optical disc basically comprises a disc-shaped transparent substrate of a plastic or glass material and a recording layer composed of a metal such as Bi, Sn, In or Te or a semi-metal provided on said substrate. Writing of information on the optical disc can be conducted, for example, by irradiating the optical disc with laser beam. Under irradiation with the laser beam, the irradiated area of the recording layer of the optical disc absorbs energy of the beam and a rise in temperature locally occurs and as a result, a chemical or physical change is caused to alter optical characteristics of the recording layer in the irradiated area, whereby the recording of information can be made. Reading of information from the optical disc is also conducted by irradiating the optical disc with laser beam. The information can be reproduced by detecting reflected light or transmitted light corresponding to the alteration in the optical characteristics of the recording layer.

As a disc structure for protecting the recording layer, there has been recently proposed an air-sandwich structure in which a recording layer is provided on at least one of two disc-shaped substrates and positioned inside the two substrates opposed to each other at a distance by interposing a ring-shaped inner spacer and a ring-shaped outer spacer between the substrates so as to form a closed space surrounded by the two substrates and two spacers. The spacer is made of a rigid material such as aluminum or iron. In the optical disc having such structure, the recording layer is not directly exposed to outer air and the recording and reproduction of information is conducted with laser beam passing through the transparent substrate. Accordingly, there is little possibility that the recording layer is physically or chemically damaged or the surface is covered with dust which is to interfere with the recording and reproduction of information of the recording medium.

A typical structure of the conventional recording medium of air-sandwich structure is illustrated in FIGS. 1 and 2, wherein FIG. 1 schematically shows an appearance of the recording medium and FIG. 2 shows a constitution of the medium by way of a sectional view.

In FIG. 2, on each of disc-shaped substrates 21a, 21b was provided each of recording layers 22a, 22b. These substrates are bonded to each other by ring-shaped inner spacer 24 via adhesive layers 23a, 23b and ring-shaped outer spacer 26 via adhesive layers 25a, 25b, whereby a closed inner space 27 is formed by the two substates 21a, 21b, the inner spacer 24 and the outer spacer 26.

As is described above, the substrates and the spacers are bonded to each other by an adhesive, which is apt to overflow towards both sides of the spacers. In more detail, an excessive amount of an adhesive is generally supplied between the substrate and the spacer to securely fix the spacer to the substrate, whereby increasing a mechanical strength of the air-sandwich structure. The excessively supplied adhesive is forced to flow out on the both sides of the spacer in the course of a procedure for bonding the spacer and the substrate proceeds under pressure. The adhesive having flowed out on both sides of the outer spacer as well as the adhesive having flowed out on the outer side (i.e., side of closed inner space 27) of the inner spacer both cause substantially no problems in practice. However, the adhesive having flowed out on the inner side (where the recording medium is to contact a spindle for rotating the medium in the procedure for writing or reading the information) causes troubles because the adhesive having flowed out and thus protruding towards the inner side causes variation of the size of the inside diameter of the recording medium. The varied size of the inside diameter of the recording medium brings about troubles in chucking with a spindle. Othewise, the varied size of the inside diameter of the medium causes eccentric rotation resulting in troubles in tracking.

In more detail, the inner wall of the inner spacer of the conventional optical disc is kept in contact with the spindle during the rotation of the disc. The writing and reading of information are carried out when the disc rotates around the spindle with high precision. Accordingly, the inside diameter of the inner spacer is very severely defined. Thus, the adhesive which protrudes from the inner wall of the inner spacer reduces the precision of the inside diameter, whereby reducing the precision in the writing and reading characteristics. Therefore, the protruded adhesive is necessarily cut off. Such cutting procedure requires additional works and sometimes causes other eccentricity.

For obviating the above-mentioned problems in the conventional recording medium of air-sandwich type, Japanese Patent Provisional Publication No. 59(1984)-14153 proposes that the the inner spacer be made of a material having increased mechanical strength and abrasion resistance as compared with the substrates and that the inside diameter of the inner spacer be made smaller than the inside diameters of the substrates. From one aspect, the proposed recording medium is advantageous in assembling, because the inside diameter of the recording medium is be defined only by the inner spacer. From other aspect, however, the proposed recording medium is disadvantageous because it necessarily uses a material of high strength such as iron or aluminum, because stable rotation required for the recording medium is needed to be assured only by the inner spacer. Such metal spacer is not economical. Further, the metal spacer is sometimes not appropriately employed in the case that plastic or glass substrates are employed. In more detail, the metal spacer and the plastic or glass substrates are substantially different in the coefficient of thermal expansion and the coefficient of expansion upon absorption of vaporized water, and such difference brings about peeling off and cracking of the adhesive layer through repeated application of shearing force when the recording medium is stored or employed at a high temperature and high relative humidity.

Japanese Patent Provisional Publication No. 60(1985)-103535 proposes that the troubles due to the overflow of the adhesive be removed by chamferring the substrates at the area for receiving the adhesive. However, a recording medium of this type easily receives on the surface of the substrates dust produced in the chamferring processing. The dust deposited on the surface of the substrate ought to be washed off after the chamferring processing. The requirement of such additional stage is naturally not advanageous.

SUMMARY OF THE INVENTION

It is an object of the present invention to provide a recording medium of air-sandwich structure which is rotatable with high precision and which is readily prepared.

Specifically, it is an object of the invention to provide a recording medium of air-sandwich structure which is kept from eccentric rotation and is employable for writing and reading even after a storage for a long period of time.

The present invention provides a recording medium of air-sandwich structure comprising two disc-shaped substrates opposed to each other, the two substrates having at the center a hole of the same size to each other, by interposing therebetween a ring-shaped inner plastic spacer and a ring-shaped outer plastic spacer and a recording layer for writing and/or reading information with laser beam which is provided on the inner surface of at least one substrate, which is improved in that said inner spacer has an inside diameter larger than the diameters of the holes of the substrates.

BRIEF DESCRIPTION OF DRAWINGS

FIG. 1 is a perspective view of a conventional recording medium of air-sandwich structure according to the present invention.

FIG. 2 is a cross-sectional view of the conventional recording medium of air-sandwich structure taken along the line X—X in FIG. 1.

FIG. 3 is a cross-sectional view of a recording medium of air-sandwich structure according to the present inventin.

DETAILED DESCRIPTION OF THE INVENTION

The information recording medium of the invention is readily prepared and the centering of the medium is easily accomplished. Moreover, the inside diameter of the recording medium is precisely defined by the inside diameter of the substrates regardless whether an adesive protrudes from the inner wall of the inner spacer or not. Therefore, there is no need of removing the protruding adhesive layer. Further, it is very advantageous to utilize an economical plastic material for the production of the spacer. Particularly, if the substrates are made of the same plastic material as that of the spacers, the resulting recording medium shows a very stable mechanical strength in a repeated use under conditions that the surrounding temperature and/or the relative humidity vary, because the substrates and the spacers shrink and expand simultaneously to the same extent with variations of the temperature and relative humidity.

The information recording medium of the invention utilizes the inner walls at the center holes of the substrates for keeping the rotation of the medium in place of the inner wall of the inner spacer which is utilized in the conventional recording medium for the same purpose. Such information recording medium of the invention is favorably employable particularly in the case the recording medium is in the form of an optical disk of a medium or small size.

A typical constitution of the information recording medium of air-sandwich structure according to the present invention is schematically illustrated in FIG. 3.

In FIG. 3, on each of disc-shaped substrates $31a$, $31b$ was provided each of recording layers $32a$, $32b$. These substrates are bonded to each other by ring-shaped inner spacer 34 via adhesive layers $33a$, $33b$ and ring-shaped outer spacer 36 via adhesive layers $35a$, $35b$, whereby a closed inner space 37 is formed by the two substrates $31a$, $31b$, the inner spacer 34 and the outer spacer 36. The inner and outer spacers are made of a plastic material. According to the present invention, the inside diameter (k) of the inner plastic spacer 34 is set to be larger than the inside diameters (l) of the center holes of the substrates, namely, under the condition of $k > l$.

According to the invention, the difference between the inside diameter of the inner plastic spacer and the inside diameter of the center holes of the substrates, namely k - l, is generally larger than 0.2 mm, preferably larger than 0.5 mm, and more preferably larger than 1.0 mm. There is no specific limitation with respect to the difference (k−l), but the upper limit may be 20.0 mm from the viewpoint of effective recording area utilizable in the recording medium.

At present, most of the optical discs are standardized in the size. There are prescribed several standards for various optical discs of from relatively large size to a small size. The present invention is favorably applicable particularly to an optical disc of a medium size or small size. Examples of the dimensions of the recording medium according to the present invention are described below with respect to an optical disc having an outer diameter of 200 mm and an optical disc having an outer diameter of 130 mm.

| Optical Disc A | |
|---|---|
| Substrate: | outer diameter: 200 mm |
| | inside diameter: 35 mm |
| | thickness: 1.1 mm |
| Inner spacer: | outer diameter: 65 mm |
| | inside diameter: 37 mm |
| | thickness: 1.2 mm |
| Optical Disc B | |
| Substrate: | outer diameter: 130 mm |
| | inside diameter: 15 mm |
| | thickness: 1.1 mm |
| Inner spacer: | outer diameter: 50 mm |
| | inside diameter: 17 mm |
| | thickness: 0.7 mm |

It is noted in FIG. 3 that the recording layer may be provided only on one substrate.

The inner spacer of the invention is made of a plastic material. Examples of the plastic materials include polyolefins such as polyethylene and polypropylene, polyamide such as nylon 6 and nylon 66; acrylic resins such as cell-cast polymethyl methacrylate, injection-molded polymethyl methacrylate; vinyl chloride resins such as polyvinyl chloride and vinyl chloride copolymers; and polycarbonate. It is preferred that the outer spacer is made of the same plastic material as that of the inner spacer.

According to the present invention, the inner surface of the substrate preferably has a recess in the inner periphery to receive the the inner spacer therein and in addition has a recess in the outer periphery to receive the outer spacer. Such recesses are advantageously employed for precise arrangement of the spacers on the substrate. The precise arrangement of the outer spacer can be done by any other method.

It should be understood that the information recording medium of the invention can take any other form, provided that the recording medium satisfies the abovedescribed characteristic feature of the invention.

The information recording medium provided with the characteristic feature according to the present invention can be prepared, for example, in the following manner.

The substrate material employed in the invention can be selected from any materials which have been employed as the substrates of the conventional recording media. From the viewpoint of optical characteristics, smoothness, workability, handling properties, long-term stability and manufacturing cost, preferable examples of the substrate material include glass such as tempered glass, acrylic resins such as cell-cast polymethyl methacrylate and injection-molded polymethyl methacrylate; vinyl chloride resins such as polyvinyl chloride and vinyl chloride copolymer; polycarbonate resins; and epoxy resins. Polycarbonate and acrylic resins are most preferred.

The substrate is preferably made of the same plastic material as that of the spacers to show the same characteristics in physical properties such as coefficient of thermal expansion and coefficient of water absorption.

The surface of the substrate on which a recording layer is provided may be provided with an undercoating layer for the purpose of improving smoothness, adhesion to the recording layer and sensitivity by heat insulating and preventing the recording layer from being denatured. Examples of material for such undercoating layer include polymer materials such as polymethyl methacrylate, acrylic acid-methacrylic acid copolymer, polyesters, polyimides, vinyl acetate-vinyl chloride copolymer, ethylenevinyl acetate copolymer, polyethylene, polypropylene and polycarbonate.

The undercoating layer can be formed on the substrate, for example, by the following procedure. First, a coating solution (or coating dispersion) is prepared by dissolving or dispersing a polymer material in an appropriate solvent. The coating solution (or dispersion) is then applied onto the surface of the substrate by a conventional coating process such as spin coating, dip coating, extrusion coating, bar coating or screen printing. The thickness of the undercoating layer is generally in the range of 0.01 to 20 $\mu$m, preferably 0.1 to 10 $\mu$m and more preferably 0.02 to 1 $\mu$m.

The substrate can be provided with a pre-groove layer which can be formed on the substrate, for instance, by introducing a radiation-curable resin between the substrate and a stamper (which is generally used for the provision of a coating layer on the substrate) and curing the introduced resin under irradiation of electron beam or ultra-violet rays. Otherwise, the pre-groove can be formed directly on the substrate on the case that the substrate is prepared from polymethyl methacrylate, polycarbonate or the like by a molding process such as injection molding or compression molding.

The recording layer is then formed on the substrate. Examples of material employed for the recording layer include metals such as Te, Zn, In, Sn, Zr, Al, Cu and Ga; semi-metals such as Bi, As and Sb; semiconductors such as Ge and Si; and their alloys and various combinations thereof. Further, sulfides, oxides, borides, silicides, carbides and nitrides of these metals and these semimetals and mixtures of these compounds and the above-stated metals can also be employed for the material of the recording layer.

The recording layer can be formed directly on the substrate or on the undercoating layer by means of metallizing, sputtering or ion plating process. The recording layer may be composed of a single layer or plural layers. The thickness of the recording layer is generally in the range of 100 to 5,500 angstroms from the viewpoint of optical density required for the optical recording.

If the recording medium is dedicated to reproduction only, a fine pattern of recess and protrusion is previously formed on one side of the substrate by means of a stamper and a layer of a reflecting material such as Al or Cu may be then formed thereon.

After the formation of the recording layer on the substrates, two substrates are bonded to each other with an adhesive agent by interposing spacers therebetween in such a manner that the recording layer is positioned inside the substrates.

A thin film of an inorganic material such as silicon dioxide, tin oxide or manganese fluoride may be formed on the free surface of the substrate (the surface not facing the recording layer) by means of vacuum metallizing or sputtering process in order to increase resistance to damage and moisture proofness.

The substrates having the recording layer on the surface are then bonded via spacers using an adhesive in such a manner that the recording layer faces each other. The bonding procedure can be done under atmospheric conditions or inert gas conditions. There is no specific limitation on the adhesive for the use in bonding the substrate and the spacer. Any known adhesive can be employed. Preferred adhesives are non-solvent type adhesives such as an epoxy adhesive, UV-curable adhesive, UV-curable epoxy adhesive, UV-curable ene-thiol adhesive, urethane adhesive, silicon adhesive, acylic resin type adhesive, and hot-melt adhesive. A surface-treating agent such as a silane-coupling agent, epoxy compound or isocyanate compound can be employed in combination with the adhesive for reinforcing the adhesion between the spacer and the substrate.

I claim:

1. In a recording medium of air-sandwich structure comprising two disc-shaped substrates opposed to each other, the two substrates having at the center a hole of the same size to each other, with a ring-shaped inner plastic spacer, a ring-shaped outer plastic spacer and a recording layer for writing and/or reading information with a laser beam interposed between the two disc-shaped substrates, wherein the recording layer is provided on the inner surface of at least one substrate, the improvement including a recessed seat means for fitting and aligning said inner spacer between said two substrates, said recessed seat means comprised of a recessed portion formed around each said hole on each said substrate, wherein said inner spacer has an inside diameter larger than the diameters of the holes of the substrates.

2. The recording medium as claimed in claim 1, wherein said inner spacer has an inside diameter larger than the diameters of the holes of the substrates by 0.2 mm or more.

3. The recording medium as claimed in claim 1, wherein said inner spacer has an inside diameter larger than the diameters of the holes of the substrates by 0.5 mm or more.

4. The recording medium as claimed in claim 1, wherein said inner spacer has an inside diameter larger than the diameters of the holes of the substrates by 1.0 mm or more.

5. The recording medium as claimed in claim 1, wherein said inner spacer has an inside diameter larger than the diameters of the holes of the substrates by 20.0 mm or less.

6. The recording medium as claimed in claim 1, wherein said inner spacer is made of the same plastic material as that of the outer spacer.

7. The recording medium as claimed in claim 1, wherein said inner spacer is made of polycarbonate.

8. The recording medium as claimed in claim 1, wherein said inner spacer is made of an acrylic resin.

9. The recording medium as claimed in claim 1, wherein said inner spacer is fixed in the recessed seat means by an adhesive.

10. The recording medium as claimed in claim 1, wherein said outer spacer is arranged in a second recessed seat means which is comprised of recessed portions formed on each of said substrates inside of the peripheral edges of said substrates.

* * * * *